(12) United States Patent
Lin

(10) Patent No.: US 6,963,744 B2
(45) Date of Patent: Nov. 8, 2005

(54) METHOD AND SYSTEM FOR SAVING POWER IN MOBILE UNITS

(75) Inventor: Rui Lin, San Diego, CA (US)

(73) Assignee: Flextronics Sales and Mktg (A-P) Ltd., Port Louis (MU)

( * ) Notice: Subject to any disclaimer, the term of this patent is extended or adjusted under 35 U.S.C. 154(b) by 395 days.

(21) Appl. No.: 10/229,744

(22) Filed: Aug. 28, 2002

(65) Prior Publication Data

US 2004/0204184 A1 Oct. 14, 2004

(51) Int. Cl.⁷ .............................................. H04Q 7/20
(52) U.S. Cl. .................. 455/437; 455/456.1; 455/574; 370/331
(58) Field of Search .................. 455/456.1, 404.2, 455/574, 457, 437, 512, 442, 513; 370/331

(56) References Cited

U.S. PATENT DOCUMENTS

| | | | |
|---|---|---|---|
| 6,067,460 A * | 5/2000 | Alanara et al. ............. | 455/574 |
| 6,108,545 A | 8/2000 | Keshavachar ............... | 455/436 |
| 6,233,448 B1 * | 5/2001 | Alperovich et al. ........ | 455/417 |
| 6,331,971 B1 * | 12/2001 | Raith ......................... | 370/311 |
| 6,452,912 B1 * | 9/2002 | Leem ......................... | 370/335 |
| 6,483,815 B1 * | 11/2002 | Laurent et al. ............. | 370/318 |
| 6,611,688 B1 * | 8/2003 | Raith ......................... | 340/992 |
| 6,633,762 B1 * | 10/2003 | Rauscher .................... | 455/437 |

* cited by examiner

*Primary Examiner*—Tilahun Gesesse
(74) *Attorney, Agent, or Firm*—Tejinder Singh; Klein O'Neill & Singh, LLP

(57) ABSTRACT

A method and system for monitoring a mobile unit location is provided. The process includes; receiving a first mobile unit location; receiving a second mobile unit location; and determining the difference between the first and the second mobile unit location and if the difference between the second and first mobile unit location is beyond a pre-determined threshold value then turning off mobile unit neighboring cell measurement for a pre-determined duration. The process can also adjust the pre-determined duration value based on which the neighboring cell measurement is stopped. The location values may be based on a global satellite positioning system.

6 Claims, 3 Drawing Sheets

METHOD AND SYSTEM FOR SAVING POWER IN MOBILE UNITS

BACKGROUND OF THE INVENTION

1. Field of the Invention

The present invention relates to mobile systems, and more particularly, to monitoring location of mobile units.

2. Background

Mobile telephones or units (cell phones) are used in every facet of modern day lives. Typically, a service area for a mobile telephone is divided into cells. Every cell includes a base station. Cells adjacent to a serving cell at any given time are referred to as neighboring cells.

Various wireless standards govern the operation of such units. For example, CDMA, GSM and TDMA are such standards, incorporated herein by reference in their entirety. These standards require every mobile unit to perform significant processing related to measuring a neighboring cell's signal strength. This requires a mobile unit to frequently turn on a RF transmitter within the mobile unit and consume power to send information to the serving network. This processing results in unnecessary power consumption even if a mobile unit is stationery or moves within a small area.

One solution for the foregoing problem is provided in U.S. Pat. No. 6,108,545, in which a user can input a time period when the mobile unit will be in a general area. The mobile unit then does not monitor the cells.

This solution is based on user input and hence its accuracy depends on the user's ability to predict when the mobile unit will be in the general area. Commercially, this solution is tedious and inaccurate.

Therefore, there is a need for a system that can automatically detect a mobile unit's location and/or movement, and stops monitoring the mobile unit's location resulting in power savings.

SUMMARY OF THE INVENTION

In one aspect of the present invention, user input is not required for a mobile unit to stop neighboring cell measurement. This saves power because the mobile unit only performs selective neighboring cell measurement based on the unit's movement.

A method and system for monitoring a mobile unit location is provided. The process includes; receiving a first mobile unit location; receiving a second mobile unit location; and determining the difference between the first and the second mobile unit location. And, if the difference between the second and first mobile unit location is beyond a pre-determined threshold value, turning off mobile unit neighboring cell measurement for a pre-determined duration. The process can also adjust the pre-determined duration value, based on which the neighboring cell measurement is stopped. The location values may be based on a global satellite positioning system.

This brief summary has been provided so that the nature of the invention may be understood quickly. A more complete understanding of the invention can be obtained by reference to the following detailed description of the preferred embodiments thereof, in connection with the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following figures.

DETAILED DESCRIPTION OF THE PREFERRED EMBODIMENTS

To facilitate an understanding of the preferred embodiment, the general architecture and operation of a service area and a mobile unit will be described first. The specific process under the preferred embodiment will then be described with reference to the general architecture.

Figure 1:
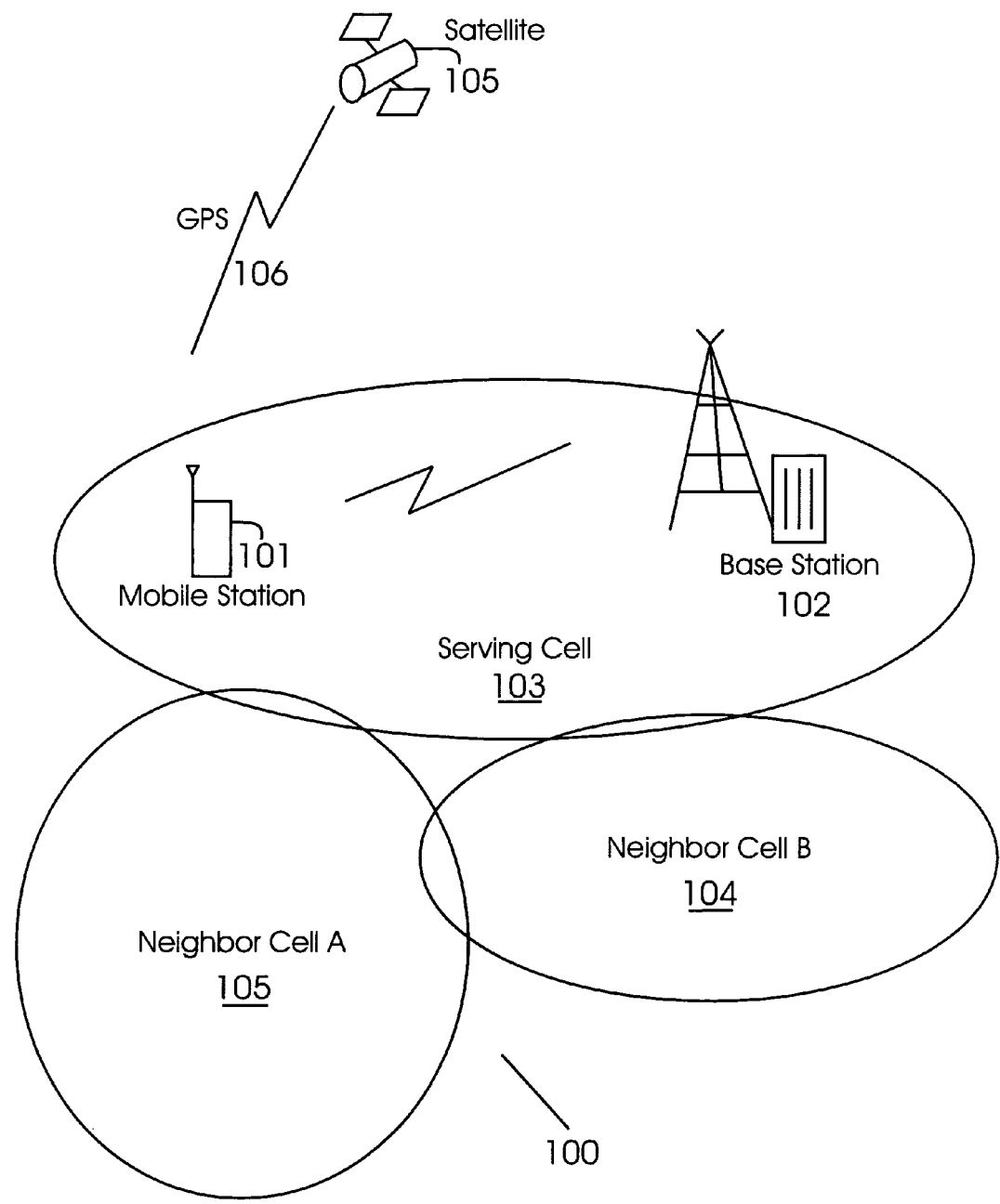
FIG. 1 is a block diagram of an overall system where mobile units operate.

FIG. 1 shows a block diagram of system 100 where a mobile unit 101 may be used. Serving cell 103 serves mobile unit 101 at a given time and includes base station 102. Cells 104 and 105 are neighboring cells adjacent to serving cell 103. Mobile unit 101 may move within cell 103 or move into another cell, for example, cell 104 and/105.

A satellite 105 may be used to provide global positioning system (GPS) co-ordinates 106 for mobile unit 101, at any given time used in the process steps described below.

Figure 2:
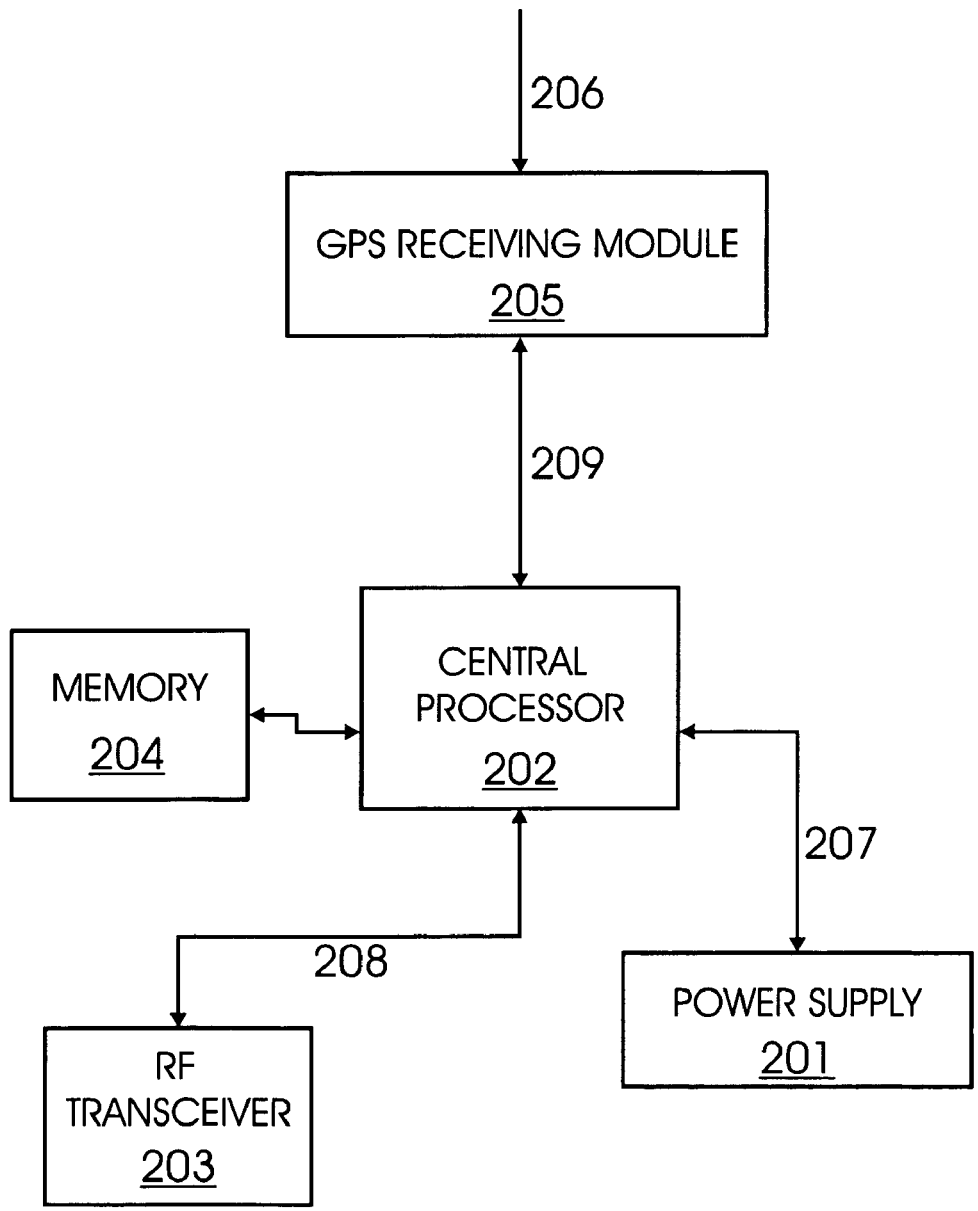
FIG. 2 is a block diagram of a system that allows selective self-monitoring of mobile units, according to one aspect of the present invention.

FIG. 2 is a block diagram of mobile unit 103 that implements the adaptive aspects of the present invention. Mobile unit 103 includes a central processor 202 that is powered by power supply 201. Processor 202 is operationally coupled to memory 204 to store the executable process steps of the present invention and other data. Memory 204 may be static, read-only or random access or any other type of memory that allows processor 204 to access and execute the process steps described below.

Mobile unit 103 includes receiving module 205 that receives mobile unit 103's location 206. The location is sent to processor 202 that stores it in memory 204.

Mobile unit 103 includes a RF transceiver 203 that transmits mobile unit 103's location to base station 102.

It is noteworthy that the adaptive aspects of the present invention are not limited to the foregoing modular structure of the present invention. Mobile unit 103 may include the foregoing components as separate or integrated modules, in hardware, software or firmware, to execute the process steps described below.

Figure 3:
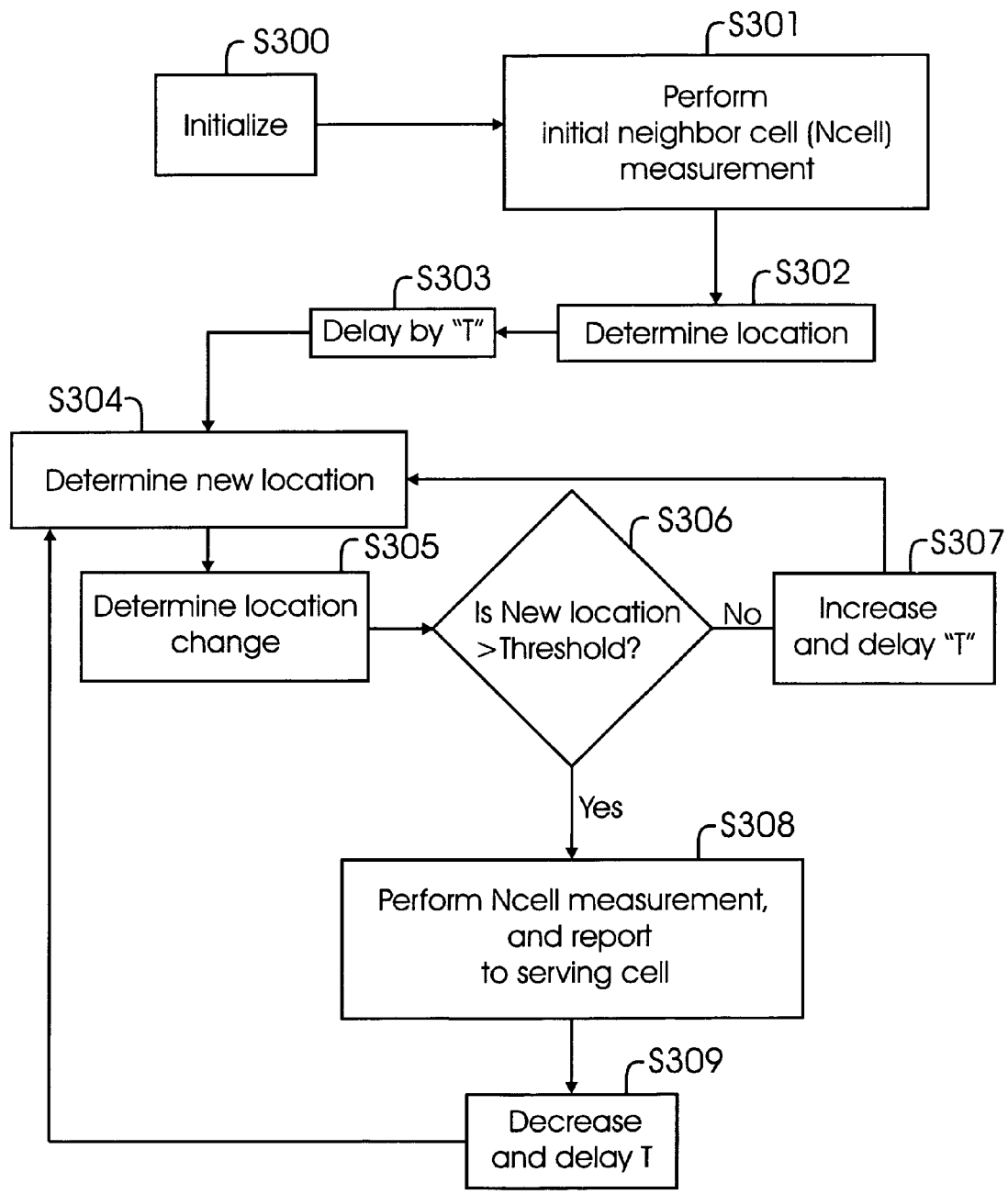
FIG. 3 is a flow diagram of executable process steps for selective self-monitoring of mobile units, according to one aspect of the present invention.

FIG. 3 is a flow diagram of one aspect of the present invention such that a mobile unit does not have to perform unnecessary processing if the mobile unit's location does not change and/or the change is within a pre-defined threshold value. This results in significant power savings and longer battery life for the mobile unit.

Turning in detail to FIG. 3, in step S300, mobile unit 101 is initialized.

In step S301, mobile unit 301 selects and camps at serving cell 103. Mobile unit 101 also performs an initial neighboring cell measurement. In this example, the measurement includes for cell 104 and 105. This initial measurement may be stored in memory 204.

In step S302, mobile unit 101 determines its location. Various position location techniques have been used in handheld devices (mobile units, personal digital assistants (PDAs") etc. Examples of such techniques are GPS used in the CDMA standard, enhanced observed time difference (EOTD) as used in the GSM standard, time difference of arrival (TDOA) and angle of arrival (AOA).

In one aspect of the present invention, GPS co-ordinates are used in step S302, to determine the location of mobile unit 101. The location of mobile unit 101 may be stored in memory 204. It is noteworthy that other techniques may be used to determine mobile unit 101's location.

In step S303, mobile unit 101 delays processing based on a pre-determined timer that is set for time "T". During this time mobile unit 101 does not perform neighbor cell measurement and hence saves power.

In step S304, after delay T, the new location of mobile unit 101 is determined. Once again, GPS co-ordinates may be used to ascertain the new location of mobile unit 101.

In step S305, the new location is compared with the location from step S302.

In step S306, the process determines if the "new" location is different than the location from step S302, and if the difference is greater than a pre-set threshold value.

If the difference is not greater than the threshold value, then in step S307, the process increases the time delay "T" and the process moves to step S304. It is noteworthy that time delay "T" may not exceed a certain value, as defined by the wireless standard under which mobile unit 101 is operating. Because mobile unit 101 does not perform neighbor cell measurements for time period "T", mobile unit 101 saves battery power.

If the difference between the location in step S304 and S302 is greater than the threshold value, then in step S308, mobile unit 101 performs neighbor cell measurement and RF Transceiver 203 transmits the new value to base station 102.

In step S309, the value of time period "T" is reduced and the process continues from step S304.

In one aspect of the present invention, a dedicated state machine (not shown) may be used to execute the foregoing process steps.

In one aspect of the present invention, user input is not required for a mobile unit to stop neighboring cell measurement. This saves power because the mobile unit only performs selective neighboring cell measurement based on the mobile unit's movement.

While the present invention is described above with respect to what is currently considered its preferred embodiments, it is to be understood that the invention is not limited to that described above. To the contrary, the invention is intended to cover various modifications and equivalent arrangements within the spirit and scope of the appended claims.

What is claimed is:

1. A method for monitoring a mobile unit, comprising:
   receiving a first set of global positioning system co-ordinates for determining a first location for the mobile unit;
   receiving a second set of global positioning system co-ordinates for determining a second location for the mobile unit, wherein the second set of global positioning system coordinates are received after a pre-determined time delay during which the mobile unit turn's off neighboring cell measurement; and
   determining a difference between the first location and the second location, and if the difference between the second location and the first location is beyond a threshold value then turning off mobile unit neighboring cell measurement without user input for a certain period; wherein the period for which the neighboring cell measurement remains turned off is adjusted depending on whether the difference between the first location and second location is greater or less than the threshold value.

2. The method of claim 1, further comprising:
   performing neighboring cell measurement if the second and/or subsequent location values are beyond the threshold value.

3. A system for monitoring a mobile unit, comprising:
   a processor for receiving a first set of global positioning system co-ordinates for determining a first location for the mobile unit and a second set of global positioning system co-ordinates for determining a second location for the mobile unit, wherein the second set of global positioning system coordinates are received after a pre-determined time delay during which the mobile unit turn's off neighboring cell measurement; and the processor determines a difference between the first location and the second location and if the difference between the second location and first location is beyond a threshold value then the mobile unit neighboring cell measurement is turned off without user input for a certain period; wherein the period during which the neighboring cell measurement remains turned off is adjusted depending on whether the difference between the first location and the second location is greater or less than the threshold value.

4. The system of claim 3, wherein the processor performs neighboring cell measurement if the second location and/or subsequent location values are beyond the threshold value.

5. A mobile unit, comprising:
   a processor for receiving a first set of global positioning system co-ordinates for determining a first location for the mobile unit and a second set of global positioning system co-ordinates for determining a second location for the mobile unit, wherein the second set of global positioning system coordinates are received after a pre-determined time delay during which the mobile unit turn's off neighboring cell measurement; and the processor determines a difference between the first location and the second location and if the difference between the second location and first location is beyond a threshold value then the mobile unit neighboring cell measurement is turned off without user input for a certain period; wherein the period during which the neighboring cell measurement remains turned off is adjusted depending on whether the difference between the first location and the second location is greater or less than the threshold value.

6. The system of claim 5, wherein the processor performs neighboring cell measurement if the second and/or subsequent location values are beyond the threshold value.

* * * * *